US006362428B1

(12) United States Patent
Pennington

(10) Patent No.: US 6,362,428 B1
(45) Date of Patent: Mar. 26, 2002

(54) SYSTEM FOR ATTACHING AND SEALING A GAUGE HOUSING ASSEMBLY TO THE END OF AN ARMORED INSULATED ELECTRICAL CONDUCTOR

(75) Inventor: Barry Pennington, Cleveland, TX (US)

(73) Assignee: Gamut Technology, Inc., Willis, TX (US)

( * ) Notice: Subject to any disclaimer, the term of this patent is extended or adjusted under 35 U.S.C. 154(b) by 0 days.

(21) Appl. No.: 09/607,633

(22) Filed: Jun. 30, 2000

Related U.S. Application Data

(60) Provisional application No. 60/142,129, filed on Jul. 2, 1999.

(51) Int. Cl.[7] .................................................. H02G 3/18

(52) U.S. Cl. ........................ 174/65 R; 174/59; 174/135; 248/56; 16/2.2; 439/462

(58) Field of Search ........................... 174/65 R, 65 SS, 174/65 G, 11 BH, 14 BH, 151, 135, 59; 248/56, 74.1; 16/2.1, 2.2; 439/462, 589, 447, 604, 606, 587

(56) References Cited

U.S. PATENT DOCUMENTS 5,567,174 A * 10/1996 Ericson et al. .............. 439/462
5,811,728 A * 9/1998 Maeda ..................... 174/65 R
6,135,398 A * 10/2000 Quesnel ..................... 248/74.1
6,139,354 A * 10/2000 Broussard ................... 439/447
6,140,582 A * 10/2000 Sheehan ................... 174/65 G
6,153,827 A * 11/2000 Taranto ....................... 174/48
6,108,882 A1 * 11/2001 Dinh ...................... 174/65 SS

* cited by examiner

*Primary Examiner*—Dean A. Reichard
*Assistant Examiner*—Dhiru R Patel
(74) *Attorney, Agent, or Firm*—Jenkens & Gilchrist, A Professional Corporation

(57) ABSTRACT

A two-part system for attaching a gauge housing assembly to an armored insulated electrical conductor includes a hollow molded connector. The hollow molded connector is molded around the armored insulated electrical conductor and the gauge housing: A seal is formed between the hollow molded connector and the insulation portion of the insulated electrical conductor. Surrounding the hollow molded connector and the gauge housing assembly is a hollow outer sleeve which is swaged to compressively engage the hollow molded connector in the end of the gauge housing assembly.

8 Claims, 1 Drawing Sheet

SYSTEM FOR ATTACHING AND SEALING A GAUGE HOUSING ASSEMBLY TO THE END OF AN ARMORED INSULATED ELECTRICAL CONDUCTOR

This application claims the benefit of U.S. Provisional Patent Application Ser. No. 60/142,129 filed Jul. 2, 1999.

BACKGROUND OF THE INVENTION

1. Technical Field

The present invention pertains to cable connectors; more particularly, the present invention pertains to a connector for attaching and sealing a gauge housing assembly to the end of an armored insulated electrical conductor.

2. History of Related Art

In recent years, it has become common practice to insert gauges into wells. The purpose of inserting gauges into wells is to monitor various downhole parameters such as temperature, pressure, Ph, radiation, and a variety of other variables which indicate the condition of the well. To effectively use the information sensed by these gauges, it is necessary to connect the downhole gauges to a monitoring system located at the top of the well. Typically, the cables which connect the downhole gauges to a monitoring system at the top well pass through the space between the production tubing and the well casing.

Because of the movement of production tubing within the casing of the well, the cables which connect the downhole gauges together must be protected from large impact forces. One system of protecting the cables connected to the downhole gauges is by using a continuous coil of armor wire which is applied around the insulated electrical conductor. Such an armor system is described in U.S. patent application Ser. No. 09/301,896 filed Apr. 29, 1999 and owned by the same assignee.

At the bottom of the well, the actual gauge may be located in a high-pressure fluidic environment. This high-pressure fluidic environment, if allowed to leak into the gauge housing to surround the electrical connection between the gauge and the wire, may actually short-circuit the electrical connection between the gauge and the wire and thus render the gauge useless.

There is therefore a need in the art to provide a system which will both attach and seal a gauge housing assembly to the end of an armored insulated electrical conductor.

SUMMARY OF THE INVENTION

A system for attaching and sealing a gauge housing assembly to the end of an armored insulated electrical conductor includes a hollow molded connector and hollow outer sleeve. The hollow molded connector has a proximal end which sealingly engages the end of the gauge housing. On the distal end, the hollow molded connector encircles the continuous coil of armor wire which surrounds the armored insulated electrical conductor. Between the proximal end and the distal end of the hollow molded connector is a central portion. The central portion, when sealed around the insulation portion of the insulated electrical connector, forms a molecular bond therewith. Surrounding the proximal end of the hollow molded connector and the gauge housing is a hollow outer sleeve. The hollow outer sleeve is swaged to compressively engage the proximal portion of the hollow molded connector and mechanically engage a groove formed around the outside of the gauge housing.

BRIEF DESCRIPTION OF THE DRAWINGS

A better understanding of the system for attaching and sealing a gauge housing assembly to the end of an armored electrical conductor may be had by reference to the following detailed description when taken in conjunction with the accompanying drawings, wherein.

DETAILED DESCRIPTION OF PRESENTLY PREFERRED EXEMPLARY EMBODIMENTS

Figure 1:
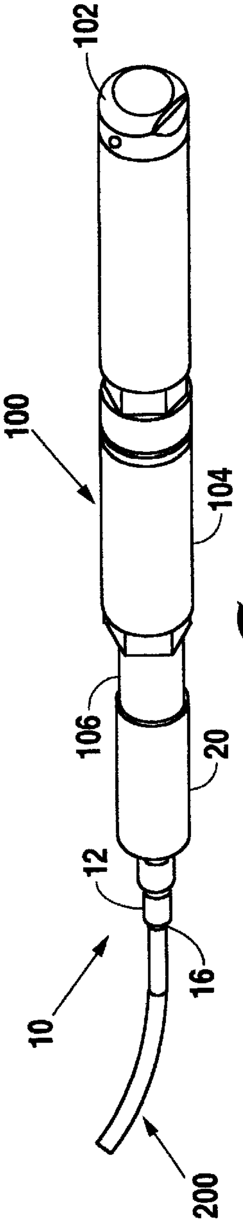
FIG. 1 is a perspective view of the system of the present invention.
Figure 2:
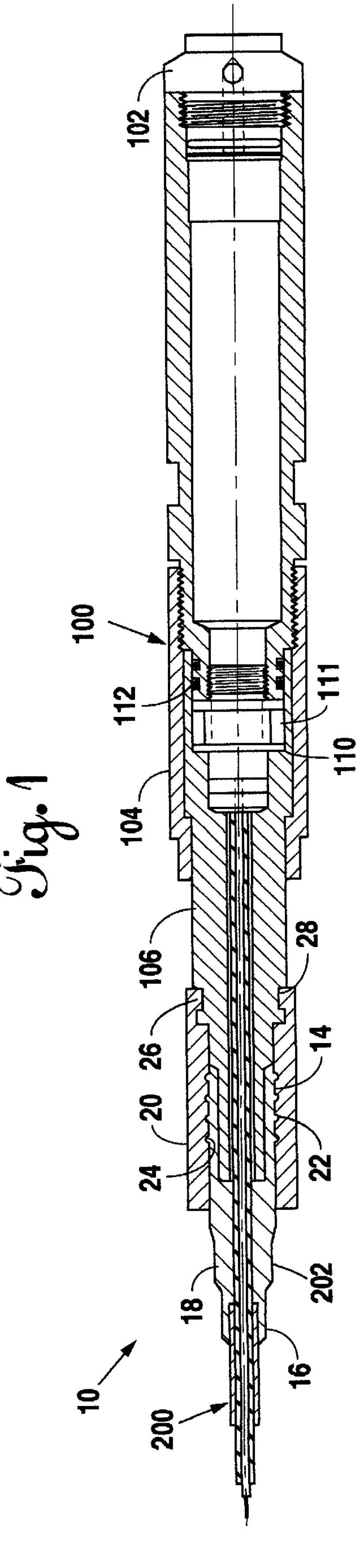
FIG. 2 is a cross-sectional view of the system shown in FIG. 1.
Figure 3:
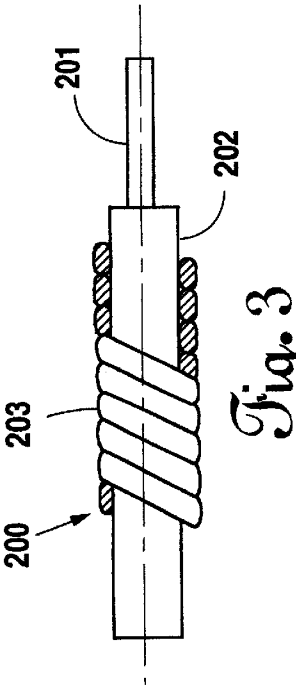
FIG. 3 is a side elevational view of the armored insulated electrical conductor.

As may be seen in FIGS. 1, 2, and 3, the present invention provides a system 10 for attaching and sealing a gauge housing assembly 100 to the end of an armored insulated electrical conductor 200.

The gauge housing assembly 200 includes a gauge retainer 102 on one end and a gauge fitting 106 on the opposite end. In the central portion of the gauge housing may be found a hermetic, non-latching panel plug 110 and a front receptacle 111. On the external portion of the gauge housing assembly 100 is a connecting collar 104. An internal seal to the gauge fittings 106 is accomplished by the use of a pair of O-rings 112.

When it is necessary to attach and seal the armored, insulated electrical conductor 200 to the gauge housing assembly 100, the electrical conductor 204, the insulation 202, and the gauge fitting 106 are placed in a mold separated by a predetermined distance. A hollow molded connector 12 is then formed around the end of the armored insulated electrical conductor 200 and the gauge fitting 106. The distal end 16 of the molded connector 12 encircles the armor 203 on the armored insulated electrical conductor 200. The proximal end 14 of the molded connector 12 encircles the gauge fitting 106. The central portion 18 of the molded connector 12 between its proximal end 14 and its distal end 16, surrounds the insulation portion 202 of the insulated electrical conductor 200. If possible, the molded connector 12 is made from the same material as the insulation portion 202 of the insulated electrical conductor 200. Thus, during the molding process, a molecular bond will be formed between the inside diameter of the molded connector 12 and the outside of the insulation 202 on the insulated electrical conductor 200.

After the molding of the hollow molded connector 12 is complete, a hollow outer sleeve 20 is slid over the molded connector 12 and over the gauge fitting 106. When the hollow outer sleeve 20 is in place, it is swaged so that an enlarged portion 26 at its proximal end engages a groove 28 formed around the gauge fitting 106. This swaging process causes the hollow outer sleeve 20 to compress the molded connector 12.

In the preferred embodiment, the gauge fitting 106 includes a series of parallel spaced-apart raised rings 22 formed on its exterior surface. The hollow outer sleeve 20 also includes a series of parallel spaced-apart grooves 24 positioned to correspond with the position of the hollow spaced-apart raised rings 22 on the gauge fitting 106. Thus, when the hollow outer sleeve 20 is swaged around the molded connector 12, the material of the molded connector, will flow cold into the series of parallel spaced-apart grooves 24 within the hollow outer sleeve 20 thus effecting a more complete seal against fluid passing between the inside of the hollow outer sleeve 20.

While the foregoing invention has been explained according to its use with oil/gas wells, it may be used in a wide variety of applications, each of which require the attachment to an insulated electrical connector.

It will be apparent to those skilled in the art that various changes may be made to the disclosed system without departing from the spirit and scope thereof and therefore the invention is not limited by that which is disclosed in the drawings and the specification but only as indicated in the appended claims.

I claim:

1. An attachment and sealing system for a gauge housing to be connected to the end of an insulated electrical conductor, which insulated electrical conductor is contained in a continuous coil of armor wire surrounding the insulated electrical conductor, said attachment and sealing system comprising:

a series of parallel, spaced apart raised rings formed on the outer surface of the gauge housing;

a hollow molded connector;

said hollow molded connector having a proximal end constructed and arranged to sealing engage the gauge housing, a distal end constructed and arranged to encircle the continuous coil of armor wire surrounding the insulated electrical conductor, and a central portion between said proximal end and said distal end;

said central portion constructed and arranged to sealingly engage the insulated armor connector with a molecular bond;

a hollow sleeve;

said hollow sleeve having a proximal end including a series of parallel, spaced apart radial grooves, said series of parallel, spaced apart radial grooves constructed and arranged to engage said series of parallel, spaced apart raised rings on the outside of the gauge housing assembly, and a distal end constructed and arranged to compressively engage said proximal end of said hollow molded connector.

2. The attachment and sealing system as defined in claim 1 wherein said hollow molded connector is made of the same material as the insulation on the insulated electrical conductor.

3. A gauge housing assembly and armored cable connection comprising:

a series of parallel, spaced apart raised rings formed on the outer surface of the gauge housing;

an insulated electrical conductor contained within and surrounded by the armored cable;

a hollow molded connector;

said hollow molded connector having a proximal end constructed and arranged to sealingly engage the gauge housing assembly, a distal end constructed and arranged to encircle the armor portion of the armored cable, surrounding the insulated electrical conductor, and a central portion located between said proximal end and said distal end;

said central portion constructed and arranged to sealingly engage the insulated electrical conductor with a molecular bond;

a hollow sleeve;

said hollow sleeve having a proximal end including a series of parallel, spaced apart radial grooves, said series of parallel spaced apart radial grooves, constructed and arranged to engage said series of parallel, spaced apart raised rings on the outer surface of the gauge housing assembly, and a distal end constructed and arranged to compressively engage said proximal end of said hollow molded connector.

4. The gauge housing assembly and armored cable connection as defined in claim 3 wherein said hollow molded connector is made of the same material as the insulation on the insulated electrical conductor.

5. An attachment and sealing system for a gauge housing to be connected to the end of an insulated electrical conductor, which insulated electrical conductor is contained in a continuous coil of armor wire surrounding the insulated electrical conductor, said attachment and sealing system comprising:

a hollow molded connector;

said hollow molded connector having a proximal end constructed and arranged to sealingly engage the gauge housing, a distal end constructed and arranged to encircle the continuous coil of armor wire surrounding the insulated electrical conductor, and a central portion between said proximal end and said distal end;

said central portion constructed and arranged to sealingly engage the insulated armor connector with a molecular bond;

a hollow sleeve;

said hollow sleeve having a proximal end including an enlarged portion constructed and arranged to fit within a groove formed around the gauge housing assembly, and a distal end constructed and arranged to compressibly engage said proximal end of said hollow molded connector.

6. The attachment and sealing system as defined in claim 5 wherein said hollow molded connector is made of the same material as the insulation on the insulated electrical conductor.

7. A gauge housing assembly and armored cable connection comprising:

an insulated electrical conductor contained within and surrounded by the armored cable;

a hollow molded connector;

said hollow molded connector having a proximal end constructed and arranged to sealingly engage the gauge housing assembly, a distal end constructed and arranged to encircle the armor portion of the armored cable surrounding the insulated electrical conductor, and a central portion located between said proximal end and said distal end;

said central portion constructed and arranged to sealingly engage the insulated electrical conductor with a molecular bond;

a hollow sleeve;

said hollow sleeve having a proximal end including an enlarged portion constructed and arranged to fit within a groove formed around said gauge housing assembly, and a distal end constructed and arranged to compressively engage said proximal end of said hollow molded connector.

8. The gauge housing assembly as defined in claim 7 wherein said hollow molded connector is made of the same material as the insulation on the insulated electrical conductor.

* * * * *